United States Patent
Hwang (10) Patent No.: US 11,057,933 B2
(45) Date of Patent: Jul. 6, 2021

(54) METHOD FOR AVOIDING COLLISION IN SYNCHRONOUS WIRELESS COMMUNICATION SYSTEM

(71) Applicant: ELECTRONICS AND TELECOMMUNICATIONS RESEARCH INSTITUTE, Daejeon (KR)

(72) Inventor: Hyun Gu Hwang, Daejeon (KR)

(73) Assignee: Electronics and telecommunications research institute, Daejeon (KR)

( * ) Notice: Subject to any disclaimer, the term of this patent is extended or adjusted under 35 U.S.C. 154(b) by 0 days.

(21) Appl. No.: 16/488,478

(22) PCT Filed: Feb. 28, 2018

(86) PCT No.: PCT/KR2018/002440
§ 371 (c)(1),
(2) Date: Aug. 23, 2019

(87) PCT Pub. No.: WO2018/159992
PCT Pub. Date: Sep. 7, 2018

(65) Prior Publication Data
US 2019/0387544 A1    Dec. 19, 2019

(30) Foreign Application Priority Data

Feb. 28, 2017 (KR) .......... 10-2017-0026778
Jan. 25, 2018 (KR) .......... 10-2018-0009332

(51) Int. Cl.
*H04W 74/08* (2009.01)
*H04W 72/04* (2009.01)

(52) U.S. Cl.
CPC ... *H04W 74/0816* (2013.01); *H04W 72/0446* (2013.01)

(58) Field of Classification Search
CPC ......... H04W 74/0816; H04W 72/0446; H04W 74/0808; H04W 74/0891
See application file for complete search history.

(56) References Cited

U.S. PATENT DOCUMENTS

2003/0174690 A1* 9/2003 Benveniste ........... H04W 74/02
370/350
2006/0104248 A1   5/2006 Koo
(Continued)

FOREIGN PATENT DOCUMENTS

EP        1962460 B1    6/2016
KR    20080080726 A    9/2008
(Continued)

OTHER PUBLICATIONS

International Search Report for PCT/KR2018/002440 dated Jun. 7, 2018.

*Primary Examiner* — Jung H Park (57) ABSTRACT

The present invention relates to a method of avoiding collision in a. More specifically, the present invention relates to a method of effectively avoiding collision when resources are allocated to and used by substantial mobile terminals in a synchronous wireless distribution communication system. The method of avoiding collision includes: determining, by a terminal, a slot to be transmitted in a main frequency channel; in a slot prior to the determined slot, performing contention using a contention deputy channel having a different frequency from the main frequency channel; and using the selected slot of the main frequency channel when winning the contention.

17 Claims, 5 Drawing Sheets

(56) References Cited

U.S. PATENT DOCUMENTS

| | | | | |
|---|---|---|---|---|
| 2014/0119307 A1* | 5/2014 | Hwang | ............ | H04W 74/0808 |
| | | | | 370/329 |
| 2015/0124696 A1 | 5/2015 | Kwon et al. | | |
| 2015/0341875 A1* | 11/2015 | Kwak | ................ | H04W 56/001 |
| | | | | 370/350 |
| 2016/0234835 A1* | 8/2016 | Yerramalli | ............ | H04L 1/0009 |

FOREIGN PATENT DOCUMENTS

| | | |
|---|---|---|
| KR | 20130005195 A | 1/2013 |
| KR | 20140041728 A | 4/2014 |
| KR | 101437470 B1 | 9/2014 |
| KR | 20150073994 A | 7/2015 |
| KR | 20160028354 A | 3/2016 |
| KR | 20160074652 A | 6/2016 |
| WO | WO2015061124 A1 | 4/2015 |

* cited by examiner

METHOD FOR AVOIDING COLLISION IN SYNCHRONOUS WIRELESS COMMUNICATION SYSTEM

CROSS-REFERENCE TO RELATED APPLICATION

This application is a national stage application, filed under 35 U.S.C. § 371, of International Patent Application No. PCT/KR2018/002440, filed on Feb. 28, 2018, which claims the priority to Korean patent application 10-2017-0026778 filed on Feb. 28, 2017 and Korean patent application 10-2018-0009332 filed on Jan. 25, 2018, the contents of which are incorporated by reference.

TECHNICAL FIELD

The present invention relates to a method of avoiding collision in a synchronous wireless communication system. More particularly, the present invention relates to a method of avoiding collision effectively when resources are allocated to and used by substantial mobile terminals in a synchronous wireless distribution communication system.

BACKGROUND ART

Up to now, in order to control collision in a wireless communication environment, scheduling and a carrier sense multiple access with collision avoidance (CSMA/CA) method are mainly used. Mostly, scheduling is used by a mobile communication base station to effectively allocate resources to terminals without collision. CSMA/CA is used in asynchronous communications, such as WiFi, and is used when several STAs perform contention to communicate with an AP. Two methods relate to a communication environment with a central control station.

In contrast, in a wireless distribution communication environment, there is not yet an effective collision avoidance method for massive connection. Particularly, in a communication environment for substantial mobile terminals rather than substantial fixed terminals, collision avoidance is extremely difficult.

A wireless distribution system that requires massive connection may be commercialized only when collision avoidance is possible. In the wireless distribution system, there is no control station, and thus scheduling by the control station is impossible. Also, CSMA/CA is used in asynchronous communications, and thus CSMA/CA is not appropriate in synchronous communications. Particularly, it is difficult for WiFi using CSMA/CA to support more than 50 users simultaneously. In general, an AP in WiFi is installed in anticipation of about 20 to 25 people present in an office.

Thus, there is a need to develop an effective collision avoidance technology in a synchronous wireless distribution communication environment where massive connection for thousands or tens of thousands of users is required.

DISCLOSURE

Technical Problem

The present invention provides a method of effectively avoiding collision in a synchronous wireless distribution communication system.

The present invention provides a method of avoiding collision in a synchronous wireless distribution communication system where massive connection for thousands or tens of thousands of users is required without a control station.

The present invention provides a method of avoiding collision on the basis of priority in a synchronous wireless distribution communication system.

It is to be understood that technical problems to be solved by the present invention are not limited to the aforementioned technical problems and other technical problems which are not mentioned will be apparent from the following description to a person with an ordinary skill in the art to which the present invention pertains.

Technical Solution

According to an embodiment of the present invention, there is provided a method of avoiding collision by a terminal in a wireless communication system. Here, the method of avoiding collision by the terminal includes: determining a first slot for performing data transmission in a first frequency channel; performing contention in a second slot prior to the first slot against other terminals; and performing the data transmission in the first frequency channel based on the contention. Here, the contention performed in the second slot may be performed through a second frequency channel.

Also, according to an embodiment of the present invention, there is provided a method of avoiding collision by a terminal in a wireless communication system. Here, the method of avoiding collision by the terminal may include: determining the first slot for performing data transmission in the first frequency channel; and performing data transmission in the first slot based on priority. Here, in the second slot which is prior to the first slot, contention may be performed based on whether priority and a clearing slot are set with other terminals.

Also, the following embodiments may apply to a method of avoiding collision, and a terminal therefor in common.

According to an embodiment of the present invention, the second slot may include multiple sub-slots, the terminal may select a first sub-slot from the sub-slots, and may perform carrier sensing from a starting sub-slot until the first sub-slot in the second slot is reached.

Here, according to an embodiment of the present invention, when the terminal does not detect a contention signal until the first sub-slot is reached, the terminal may transmit the contention signal starting from the first sub-slot up to a last sub-slot in the second slot, and may perform the data transmission in the first slot through the first frequency channel.

Also, according to an embodiment of the present invention, when the terminal detects a contention signal until the first sub-slot is reached, the terminal may drop the data transmission.

Also, according to an embodiment of the present invention, when the terminal does not detect a contention signal until the first sub-slot is reached, the terminal may select a second sub-slot from a sub-slot subsequent to the first sub-slot up to a last sub-slot in the second slot, and the terminal may transmit the contention signal starting from the first sub-slot until the second sub-slot is reached, and may further perform the carrier sensing in the second sub-slot.

Also, according to an embodiment of the present invention, when the terminal determines that another contention signal is present through the carrier sensing performed in the second sub-slot, the terminal may drop transmitting of the contention signal starting from the second sub-slot, and may drop the data transmission in the first slot.

Also, according to an embodiment of the present invention, when the terminal determines that there is no another contention signal through the carrier sensing performed in the second sub-slot, the terminal may transmit the contention signal starting from a sub-slot subsequent to the second sub-slot up to the last sub-slot, and may perform the data transmission in the first slot through the first frequency channel.

Also, according to an embodiment of the present invention, the first frequency channel may be a main frequency channel, and the second frequency channel may be a contention deputy channel.

Also, according to an embodiment of the present invention, the wireless communication system may be a synchronous wireless communication system.

Also, according to an embodiment of the present invention, a contention signal of the second frequency channel may be a tone signal.

Also, according to an embodiment of the present invention, the second slot may include multiple sub-slots, a starting sub-slot of the multiple sub-slots may be designated as a slot clearing sub-slot for a terminal that has used the first slot in a previous frame, and the terminal that has used the first slot in the previous frame may transmit a contention signal in the slot clearing sub-slot.

Also, according to an embodiment of the present invention, a terminal having no priority may perform carrier sensing in the slot clearing sub-slot, and when the contention signal is detected through the carrier sensing, the data transmission in the first slot may be dropped, and when the contention signal is not detected through the carrier sensing, a first sub-slot may be selected from sub-slots consisting of a sub-slot subsequent to the starting sub-slot up to a last sub-slot, and the carrier sensing may be further performed starting from the sub-slot subsequent to the starting sub-slot until the first sub-slot in the second slot is reached.

Also, according to an embodiment of the present invention, the second slot may include multiple sub-slots, an arbitrary one slot of the multiple sub-slots may be designated as a priority sub-slot for a terminal having priority, the terminal having priority may perform carrier sensing until the priority sub-slot is reached, and when a contention signal is not detected through the carrier sensing, the contention signal may be transmitted in the priority sub-slot, a first sub-slot may be selected from sub-slots consisting of a sub-slot subsequent to the priority sub-slot up to a last sub-slot, and the carrier sensing may be further performed starting from the sub-slot subsequent to the priority sub-slot until the first sub-slot in the second slot is reached.

Also, according to an embodiment of the present invention, a terminal having no priority may perform the carrier sensing until the priority sub-slot is reached, and when the contention signal is detected through the carrier sensing, the data transmission in the first slot may be dropped, and when the contention signal is not detected through the carrier sensing, the first sub-slot may be selected from the sub-slots consisting of the sub-slot subsequent to the priority sub-slot up to the last sub-slot, and the carrier sensing may be further performed starting from the sub-slot subsequent to the priority sub-slot until the first sub-slot in the second slot is reached.

Also, according to an embodiment of the present invention, the second slot may include multiple sub-slots, arbitrary continuous several slots of the multiple sub-slots may be designated as a priority sub-slot group for a terminal having priority, the terminal having priority may perform carrier sensing until the priority sub-slot group is reached, and when a contention signal is not detected through the carrier sensing, a first sub-slot may be selected from the priority sub-slot group, and the carrier sensing may be further performed starting from a start of the priority sub-slot group until the first sub-slot is reached.

Also, according to an embodiment of the present invention, a terminal having no priority may perform the carrier sensing until an end of the priority sub-slot group, and when the contention signal is detected through the carrier sensing, the data transmission in the first slot may be dropped, and when the contention signal is not detected through the carrier sensing, the first sub-slot may be selected from sub-slots consisting of a sub-slot subsequent to the priority sub-slot group up to a last sub-slot, and the carrier sensing may be further performed starting from the sub-slot subsequent to the priority sub-slot group until the first sub-slot in the second slot is reached.

Also, according to an embodiment of the present invention, a terminal having no priority may perform the carrier sensing until the priority sub-slot group is reached, and when the contention signal is detected through the carrier sensing, the data transmission in the first slot may be dropped, and when the contention signal is not detected through the carrier sensing, the first sub-slot may be selected from sub-slots consisting of a starting sub-slot of the priority sub-slot group up to a last sub-slot in the second slot, and the carrier sensing may be further performed starting from the starting sub-slot of the priority sub-slot group until the first sub-slot is reached.

Also, according to an embodiment of the present invention, the second slot may include multiple sub-slots, a sub-slot subsequent to a starting sub-slot of the multiple sub-slots may be designated as an ACK clearing sub-slot for a terminal that has received a slot allocation request, the terminal that has received the slot allocation request may perform carrier sensing until the ACK clearing sub-slot is reached, and when a contention signal is detected through the carrier sensing, the data transmission in the first slot may be dropped, to and when the contention signal is not detected through the carrier sensing, the terminal that has received the slot allocation request may transmit the contention signal in the ACK clearing sub-slot.

Also, according to an embodiment of the present invention, a terminal that has not received the slot allocation request may perform the carrier sensing until the ACK clearing sub-slot is reached, and when the contention signal is detected through the carrier sensing, the data transmission in the first slot may be dropped, and when the contention signal is not detected through the carrier sensing, a first sub-slot may be selected from sub-slots consisting of a sub-slot subsequent to the ACK clearing sub-slot up to a last sub-slot, and the carrier sensing may be further performed starting from the sub-slot subsequent to the ACK clearing sub-slot until the first sub-slot in the second slot is reached.

Advantageous Effects

As described above, according to the present invention, the method of effectively avoiding collision in the synchronous wireless distribution communication system can be provided.

According to the present invention, the method of avoiding collision in the synchronous wireless distribution communication system where massive connection for thousands or tens of thousands of users is required without a control station can be provided.

According to the present invention, the method of avoiding collision on the basis of priority in the synchronous wireless distribution communication system can be provided.

According to the present invention, clearing can be used for continuous collision avoidance.

Effects that may be obtained from the present invention will not be limited to only the above described effects. In addition, other effects which are not described herein will become apparent to those skilled in the art from the following description.

MODE FOR INVENTION

Hereinafter, exemplary embodiments of the present invention will be described in detail with reference to the accompanying drawings. In the following description and the accompanying drawings, substantially same elements are denoted by the same reference numerals, and a repeated description thereof will be omitted. Also, in describing the present invention, it is noted that when the detailed description of known functions or configurations related with the present invention may make the gist of the present invention unclear, the detailed description thereof will be omitted.

In describing embodiments of the present invention, it is noted that when the detailed description of known configurations or functions related to the present invention may make the gist of the present invention unclear, the detailed description of thereof will be omitted. Also, portions that are not related to the present invention are omitted in the drawings, and like reference numerals designate like elements.

In the present invention, when an element is "coupled to", "combined with", or "connected to" another element, it can be directly coupled to the other element or intervening elements may be present therebetween. Also, when a component "comprises" or "includes" an element, unless there is another opposite description thereto, the component does not exclude other elements but may further include the elements.

In the present invention, the terms "first", "second", etc. are only used to distinguish one element from another element. Unless specifically stated otherwise, the terms do not denote an order or importance. Thus, without departing from the scope of the present invention, a first element of an embodiment could be termed a second element of another embodiment. Similarly, a second element of an embodiment could also be termed a first element of another embodiment.

In the present invention, elements that are distinguished from each other to clearly describe each feature do not necessarily denote that the elements are separated. That is, a plurality of elements may be integrated into one hardware or software unit, or one element may be distributed into a plurality of hardware or software units. Accordingly, even if not mentioned, the integrated or distributed embodiments are included in the scope of the present invention.

In the present invention, elements described in various embodiments do not denote essential elements, and some of the elements may be optional. Accordingly, an embodiment that includes a subset of elements described in another embodiment is included in the scope of the present invention. Also, an embodiment that includes the elements which are described in the various embodiments and additional other elements is included in the scope of the present invention.

The environment to which the present invention applies may be assumed as follows.

First, there are fixed terminals and mobile terminals.

Second, there are thousands or tens of thousands of distributed terminals.

Third, synchronization of each terminal is set.

Fourth, it is a distribution communication environment having no central control station.

Fifth, each terminal has a right to use resources equally.

In the following embodiments, a method of avoiding collision effectively under the above-described environment will be described. However, the present invention is not limited to the above-described environment, and may apply to other fields.

Also, as an example, the characteristic of the synchronous wireless distribution environment is that there is no central control station and all terminals are synchronized. Also, each terminal may use the resource equally.

However, as an example, the present invention may apply to the case satisfying part of the above-described environment, and is not limited to a particular condition.

Also, the resource used by the terminal may be frequency or time. The present invention will be described on the basis of time resources. However, as an example, the present invention may apply to frequency resources equally, and is not limited to the described embodiments.

A method where synchronized terminals share time resources is called time-division multiple access (TDMA). In TDMA, a single frame is divided into several slots. In the present invention, for convenience, it is assumed that a single frame is one second in length and the number of slots is 500. However, the length of the frame or the number of slots may vary, and is not limited to the described numerical value.

Here, as an example, in an easy way, a way of avoiding collision is that each terminal randomly selects one slot out of 500. In this case, collision avoidance may work well, when the number of terminals is several tens.

However, in a massive connection environment, there are thousands or tens of thousands of terminals. Therefore, 500 slots may not support massive connection. However, the number of slots should not be recklessly increase because as the number of slots increases, the amount of information in a single slot decreases. Thus, additional collision avoidance ways are required.

Hereinbelow, considering the above-described environment, various methods of collision avoidance will be described.

Embodiment 1

As a first method, each of the terminals may perform collision contention in the prior slot to a selected slot in advance. However, in this way, the prior slot may not perform data transmission because it is used for collision contention. In this case, the maximum usage rate of the channel may be limited to 50%. For this reason, CSMA/CA is a technology that may only be used in an asynchronous communication system so far. However, in the present invention, in order to use CSMA/CA in a synchronous system, a contention deputy channel is applied.

Figure 1:
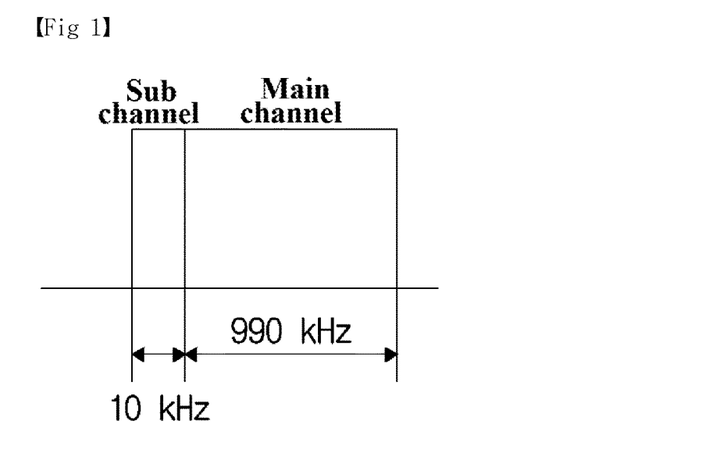
FIG. 1 is a configuration view illustrating a main channel and a sub-channel performing contention instead.

More specifically, referring to FIG. 1, a main channel and a sub-channel compose a single pair. The general data channel may have a band width of several MHz in broadband. Here, a main communication band may be used as a data channel as it is. A channel for contention uses a narrowband signal. As the narrowband signal, a frequency tone may be used. The frequency tone has a band width ranging several kHz to several tens kHz, and thus has a band width equal to or less than 1/100 of a broadband bandwidth. For example, when a tone channel of 10 kHz and a data channel of 990 kHz compose a 1 MHz band, the maximum usage rate of the data channel is 99% under the assumption that there is no collision. In this band, using CSMA/CA may be advantageous compared to the maximum usage rate of the channel is 50%. Here, for example, the sub-channel may be allocated as being adjacent to the main channel. Also, for example, the sub-channel may be allocated as being spaced apart from the main channel, and is not limited to the embodiment.

That is, in the environment where multiple (e.g. thousands or tens of thousands) terminals are present, the multiple terminals set channels for contention differ from data transmission channels, thereby enhancing frequency efficiency.

Also, as an example, in the front slot of slots to be used, the terminals may perform contention in advance.

As an example, for effective contention, in a contention channel, a single slot of 2 ms in length may be divided into 56 sub-slots. In this case, a single sub-slot is about 35.714 us in time. However, the number of sub-slots is only an example, and may differ without limited to the embodiment.

Figure 2:
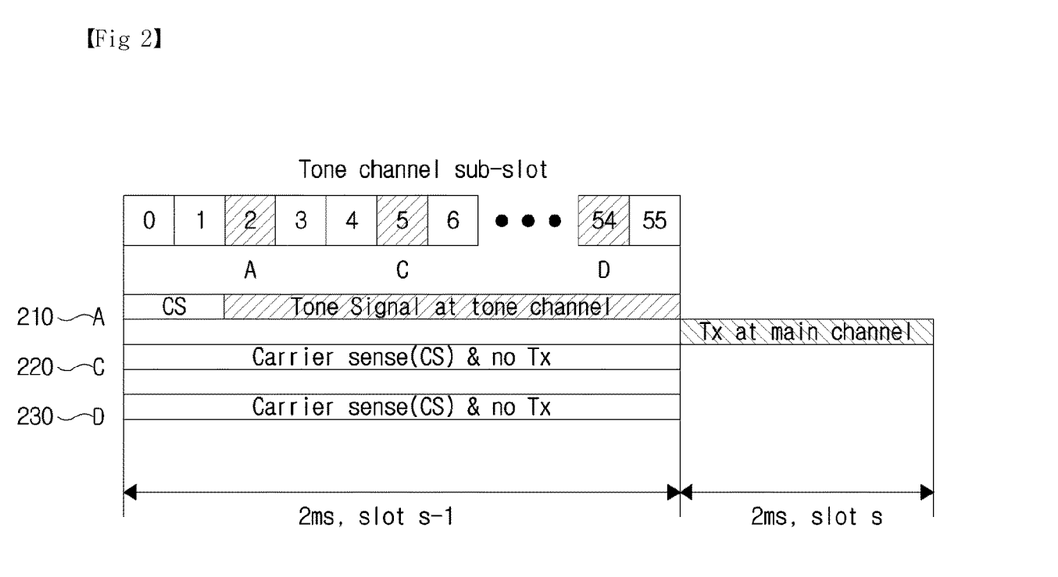
FIG. 2 is an exemplary view illustrating a proposed synchronous CSMA/CA.

Here, as an example, when a terminal A 210 is determined to use the S-th slot of the main channel, the terminal A 210 may perform contention in the S-1-th slot of to contention deputy channel in advance. For example, when the terminal A 210 is determined to use the slot 10 the main channel, the terminal A 210 may perform contention in the slot 9 of the contention deputy channel in advance. That is, the terminal A 210 may select one sub-slot from sub-slots 0 to 55. Here, when the selected sub-slot number is N, carrier sensing may be performed up to a sub-slot prior to the selected sub-slot. When there is no detected signal as the result of the performance, a contention tone signal is transmitted starting from the selected sub-slot until the sub-slot 55 and data is transmitted at the slot 10 in the main channel. Here, as an example, when there is a detected signal as the result of the performance by the terminal A 210, the terminal A 210 determines losing contention and may not transmit any signal in the tone channel and the main channel.

Specifically, referring to FIG. 2, the terminal A 210, a terminal C 220, and a terminal D 230 may perform contention in the slot s-1 of the contention deputy channel in advance so as to use the slot s of the main channel. For example, the terminal A 210 may select the number 2. Also, the terminal C 220 may select the number 5. Also, the terminal D 230 may select the number 54. Here, the terminal A 210 may perform carrier sensing (CS) on a signal in the sub-slots 0 and 1, such that the terminal may detect that no other contention signal is present. Thus, the terminal A 210 may transmits a contention signal starting from the sub-slot 2 until the sub-slot 55 of the tone channel. Next, the terminal A 210 may transmit a data signal in the slot s of the main channel.

In the meantime, the terminal C 220 may sense a signal from the sub-slot 0 to the sub-slot 4, and may identify the signal transmitted by the terminal A 210. Here, the terminal C 220 determines losing contention to the terminal A 210, and may not perform data signal transmission in the slot s of the main channel. Also, the terminal D 230 may sense a signal until the sub-slot 54 is reached, may determine losing contention, and may not transmit a data signal in the slot s of the main channel.

However, the sub-slot allocation is only an embodiment, and is not limited to a particular number.

Here, for example, the signal of the contention deputy channel may use a frequency tone signal. In this case, the frequency band may be used least. Hereinafter, the contention signal is referred to as a tone signal. However, the contention signal may be set differently, and is not limited to the embodiment.

Due to the contention, the terminals that have selected the same slots may avoid collision. For example, in the situation, the terminals that selected the same slot out of 500 may avoid collision again.

However, in massive connection, collision avoidance is required to thousands or tens of thousands of terminals. For example, when 50 thousand users try to perform resource allocation simultaneously, there is still high collision probability. Even if it is not an accurate calculation, when each of 500 slots is divided into 56 sub-slots, total 28,000 sub-slots are present, which is less than 50,000. Therefore, intuitively, it is impossible to support 50 thousand users, and it is necessary to consider this situation.

Embodiment 2

Considering the situation, a scheme for avoiding collisions in terminals may be set. For example, the embodiment 2 may be an embodiment where additional contention is performed based on the embodiment 1.

More specifically, like the embodiment 1, the terminal that has performed a first contention may perform second contention. For example, the terminals that have won collision contention through CSMA/CA scheme may perform collision detection contention. For example, the second contention is referred to as collision detection and drop (CDAD). However, the name is not limited to the above-described name, and the same contention may be referred to another name without being limited to the embodiment.

The terminal that has won the first contention may perform contention again starting from a sub-slot which is subsequent to the selected first sub-slot. In the first contention, when the selected sub-slot number is low, it may mean winning the contention. That is, it may mean having superiority in contention. In contrast, in the second contention, a terminal that has selected a second sub-slot with the highest number may win the contention. That is, the terminal with the highest slot number may have superiority in contention. Here, for example, the second sub-slot is one selected from a sub-slot subsequent to the first sub-slot to the last sub-slot. In the selected second sub-slot, the terminal may perform signal sensing again. Here, as the result of signal sensing, a contention signal of another terminal may give up contention. For example, as the result of signal sensing, when a contention signal of another terminal is detected, signal transmission may be dropped.

Figure 3:
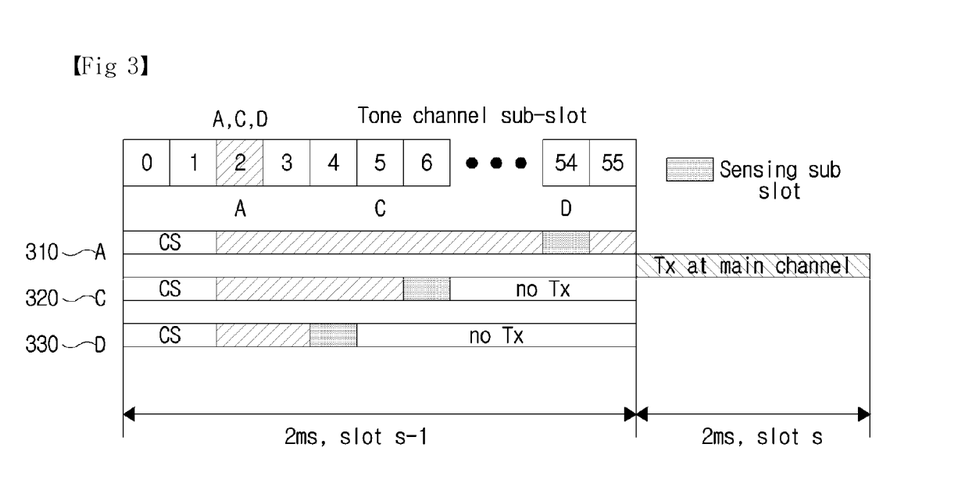
FIG. 3 is an exemplary view illustrating a proposed CDAD.

For example, referring to FIG. 3, CDAD may be performed. More specifically, a terminal A 310, a terminal C 320, and a terminal D 330 may select the same sub-slot. Here, selection of each terminal may be the first contention. For example, the terminal A 310, the terminal C 320, and the terminal D 330 may select the same sub-slot 2. In this case, like the embodiment 1, when only the first contention is performed, collision may not be avoided. Thus, the terminal A 310, the terminal C 320, and the terminal D 330 may perform the second contention starting from the sub-slot 3.

For example, in FIG. 3, each of the terminal A 310, the terminal C 320, and the terminal D 330 may transmit a contention signal after the sub-slot 2. Here, for example, the terminal D 330 may select the sub-slot 4 as the second sub-slot. Thus, the terminal D 330 may perform signal sensing in the sub-slot 4. Here, the terminal A 310 and the terminal C 320 transmit contention signals, and thus the terminal D 330 may detect the signals and may drop the contention. That is, the terminal D 330 may not transmit the contention signal any more. Also, for example, the terminal C 320 may select the sub-slot 6 and may perform sensing in the sub-slot 6. Here, since the terminal A 310 continuously transmits the contention signal, the terminal C 320 may detect the contention signal and may drop the contention. Also, for example, the terminal A 310 may perform signal sensing in the sub-slot 54, and may identify that there is no contention signal. Thus, the terminal A 310 transmits the contention signal until the sub-slot 55, and finally may win the contention. Accordingly, the terminal A 310 may perform data transmission using the slot s of the main channel.

CDAD may be a collision contention scheme more advanced than the conventional collision contention scheme. Intuitively, sub-slots for more than 50,000 users are obtained. For example, 500*56*55 obtains 1,540,000. The reason for being multiplied by 55 is that mostly, only terminals that selected the sub-slot 0 may survive through CSMA/CA contention when there are substantial terminals in massive connection. Therefore, the surviving terminals may perform additional CDAD contention starting from the number 1 until the number 55.

Figure 4:
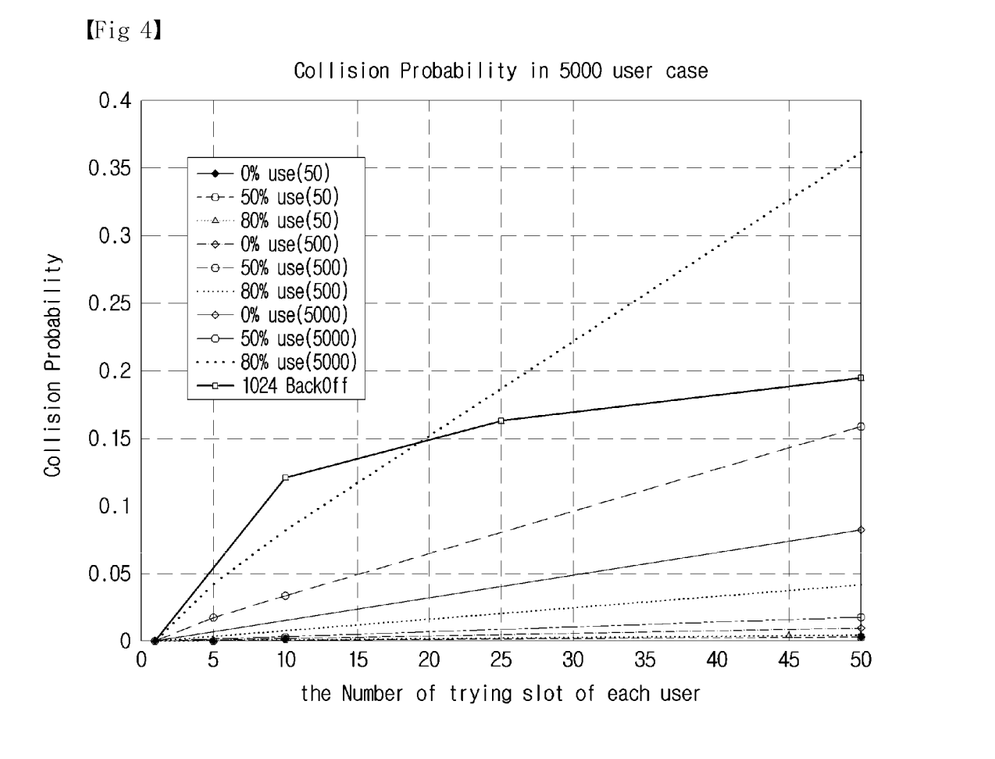
FIG. 4 is a graph illustrating a performance of the proposed method of avoiding collision.

Here, based on the above description, about a value of 3.2% may be obtained by calculating 50,000/1,540,000. FIG. 4 shows simulated values based on the above description. A graph of 50 users, 500 users, and 5000 users is shown. Here, the horizontal axis of the graphs is the number of slots to be allocated. The collision probability when trying to allocate 10 slots to 5000 users, namely, when trying to allocate one slot to 50000 users, is about 2%, which is similar the calculated value intuitively. Moreover, even when half of the slots of the channel are in use, the collision probability may be only about 4%.

Thus, it is possible to effectively avoid collision of 50 thousand substantial terminals.

That is, based on the embodiment 2, at first step, terminals are distributed into 500 slots per second so as to avoid collision. At second step, CSMA/CA contention is performed in the prior slot to the relevant slot through the contention deputy channel so as to avoid collision. Also, at last step, terminals that have won the second contention perform CDAD contention so as to avoid collision.

For example, FIG. 4 also shows performance of CSMA/CA scheme in asynchronous communications. Here, the horizontal axis is the number of user rather than the number of slots. Here, the number of back-off windows is 1024 used in WiFi. When collision does not occur, a procedure of reducing the number of back-off windows to half in performing the subsequent contention is executed. When the number of users is 10, the collision probability exceeds 10%. When the number of users is 50, the collision probability is 20%.

There is no example of using the CSMA/CA scheme, which is used in asynchronous communications, in a synchronous distribution system. The present invention applies the CSMA/CA contention scheme to the contention deputy channel in the synchronous distribution system and proposes a new second contention scheme called CDAD.

Also, for example, among time-division multiple access (TDMA) systems, there is self-organized time-division multiple access (SOTDMA) which is only commercialized in synchronous distribution communication systems.

Hereinafter, an application method of the present invention limiting to SOTDMA of TDMA will be described. However, the application method is not limited to the embodiment if it is possible.

For example, SOTDMA, which is commercialized in ship communication, may occupy a slot continuously by using a C bit which is a continuous bit once the slot is allocated. That is, when the C bit is '1', the same slot may be continuously used in the subsequent frame.

Figure 5:
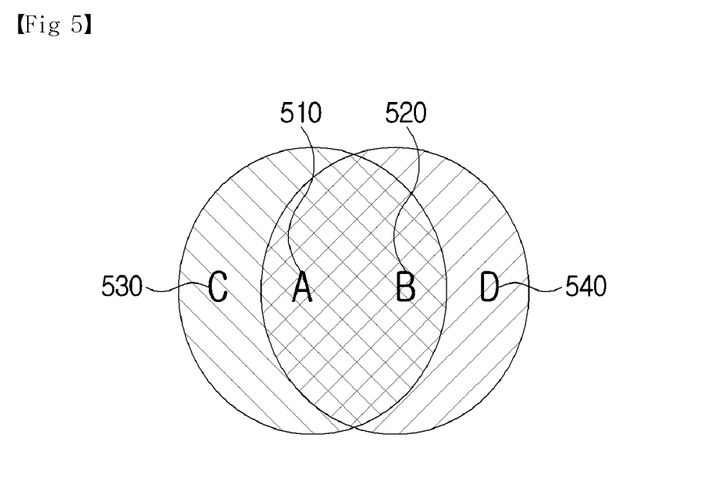
FIG. 5 is a conceptual view illustrating a proposed slot clearing.

In the case of the distribution communication system using SOTDMA, collision may occur even after a particular slot is allocated. For example, referring to FIG. 5, collision may occur in the hidden node problem. More specifically, a signal of a terminal A 510 only reaches within a backslash circle ("\" marked circle), and a signal of a terminal B 520 only reaches within a common slash circle Cr marked circle). The terminal A 510 communicates with the terminal B 520 by using the slot s. That is, as the same time interval, the slot s is used but may cause a problem for space reasons. For example, when communication is performed using the slot s, all adjacent terminals to the terminal A 510 and the terminal B 520 are required to do nothing (or be in a slip state). Otherwise, collision may occur in signal transmission. Here, when the terminal A 510 transmits a signal to the terminal B 520, a terminal C 530 has already detected the signal transmitted by the terminal A 510 in the previous frame and may know signal transmission of the terminal A 510 and may do nothing. However, a terminal D 540 may determine that the slot s is unoccupied because the signal of the terminal A 510 does not reach the terminal D. Thus, the terminal D 540 may transmit a signal in the slot s. When the terminal D 540 transmits a signal, the two signals may collide at the terminal B. Here, for example, hereinafter, slot clearing for avoiding collision will be described.

Slot clearing may be performed by reserving the slot 0 as a clearing slot in collision contention in the first CSMA/CA scheme. For example, in performing the first contention using the contention deputy channel having a different frequency, the slot of the contention deputy channel may be divided into sub-slots. Like the embodiment 1 or 2, 56 sub-slots are assumed. Among these sub-slots, actual contention may be performed in sub-slots except for the sub-slot 0. That is, a terminal to which a new slot is to be allocated performs the first CSMA/CA contention using the sub-slot 1 up to the sub-slot 55. However, signal sensing may include the sub-slot 0.

In SOTDMA, when the slot of the main channel is already occupied, a method of continuously using the slot s may be considered. Here, in the previous slot s−1 of the contention deputy channel, the contention signal may be transmitted starting from the sub-slot 0. In this way, other terminals in the vicinity select sub-slots subsequent to the sub-slot 0, and thus completely lose the contention. Accordingly, the slot of the main channel may be continuously used by the two terminals occupying the slot.

As described above, "slot clearing" may refer to preventing adjacent terminals from using the slot s by transmitting the contention signal starting from the sub-slot 0 in the previous slot s−1 of the contention deputy channel so as to continuously use the slot s of the already occupied main channel without collision.

Hereinafter, three methods for setting the priority by combining the slot contention scheme and the slot clearing scheme proposed in the present invention will be described. When the priority is set, the collision probability of particular terminals having the priority may be greatly reduced. For example, it may be assumed that the priority is given only to a particularly related terminal. However, the methods for setting the priority may be variously performed, and are not limited to the embodiments.

Embodiment 3-1

The first method of setting the priority is as follows. Like the embodiment 1 or 2, in performing the CSMA/CA contention using the contention deputy channel having the different frequency, it may be assumed that the slot of the contention deputy channel is divided into 56 sub-slots. However, as described above, the number of sub-slots may vary without being limited to the embodiments.

Here, the sub-slot 0 may be reserved as a slot clearing sub-slot used by the priority terminal. The sub-slot 1 may be reserved as a slot in which a terminal having the priority performs clearing on the terminal having no priority. Next, the sub-slot 2 may be reserved as a clearing slot between terminals having no priority.

In the above-described environment, a terminal with the priority may select the sub-slot 1 to prevent transmission of terminals having no priority. Next, starting from the sub-slot 2 until the last sub-slot, terminals having priority may perform contention. Here, for example, after priority contention, like the embodiment 2, CDAD, which is the second contention, may be further performed, and it is not limited to the embodiment.

Figure 6:
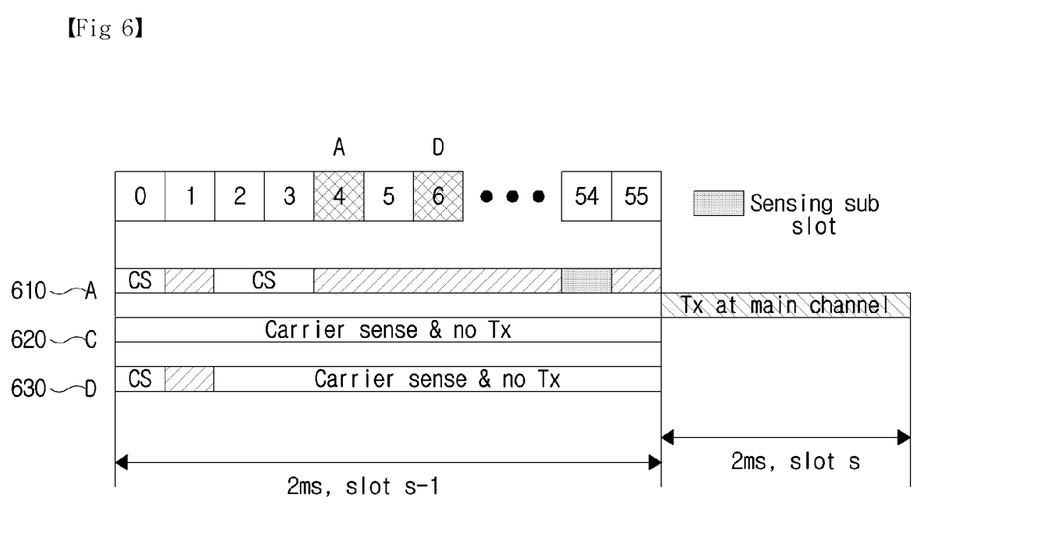
FIG. 6 is an exemplary view illustrating first proposed priority setting.

For example, referring to FIG. 6, a terminal A 610 and a terminal D 630 may have priority, and a terminal C 620 may not have the priority. However, it is only an example, and is not limited to the embodiment. The terminal A 610 and the terminal D 630 may transmit a signal to the sub-slot 1 so as to perform clearing for a terminal having no priority. As the result of clearing, the terminal C having no priority may completely lose the contention. Next, the terminal A 610 and the terminal D 630 may perform contention starting from the sub-slot 2 until the sub-slot 55. Here, when the terminal A 610 selects the sub-slot 4 and the terminal D 630 selects the sub-slot 6, the terminal A 610 may win the contention. That is, the terminal A 610 may have priority in the contention. The terminal A 610 that has won the CSMA/CA contention first may perform the CDAD contention second. In FIG. 6, the terminal A 610 may perform the CDAD contention where the second sub-slot 54 is selected.

Embodiment 3-2

The second method of setting the priority is as follows. Like the embodiment 1 or 2, in performing the CSMA/CA contention using the contention deputy channel having the different frequency, it may be assumed that the slot of the contention deputy channel is divided into 56 sub-slots. However, as described above, the number of sub-slots may vary without being limited to the embodiments.

Also, the sub-slot 0 may be reserved as a clearing slot for the priority terminals. Only the terminal having priority may select a sub-slot from the sub-slot 1 up to the sub-slot N. The terminals having no priority may reserve the sub-slot N+1 as a clearing slot for the terminal having no priority. Contention of selecting one sub-slot from sub-slots N+2 up to the last 55 may be performed. Here, N may range 2 to 53.

Under the above-described environment, when any one terminal having the priority attempts to occupy the slot, the terminals having no priority may lose the contention.

Figure 7:
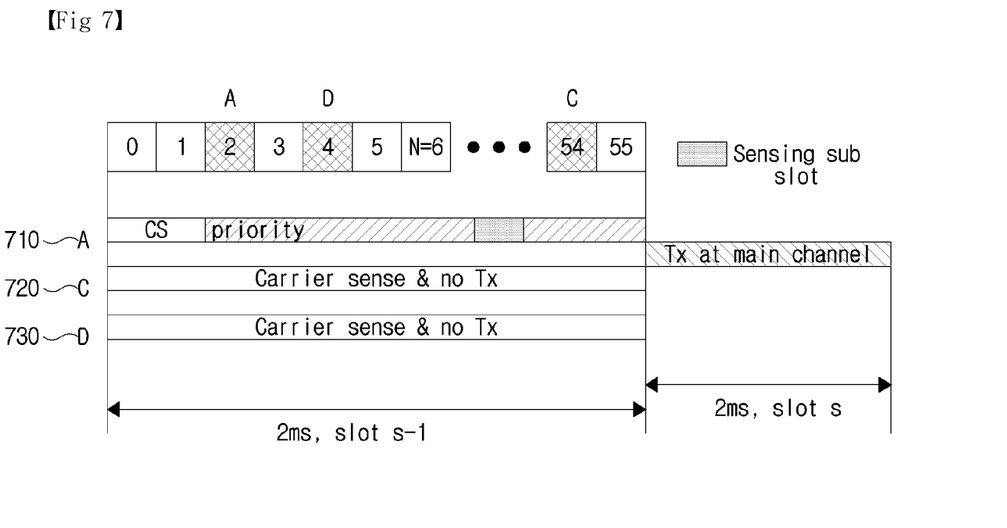
FIG. 7 is an exemplary view illustrating second proposed priority setting.

For example, referring to FIG. 7, a terminal A 710 and a terminal D 730 may have priority, and a terminal C 720 may not have priority. Also, for example, when N is 6, the terminal A 710 and the terminal D 720 may select the sub-slots 2 and 4, respectively. Thus, the terminal A may win the contention. Here, the terminal C 720 having no priority may completely lose the contention. The terminal A may perform the CSMA/CA contention first and may perform the CDAD contention second.

Embodiment 3-3

The third method of setting the priority is as follows.

Like the embodiment 1 or 2, in performing the CSMA/CA contention using the contention deputy channel having the different frequency, it may be assumed that the slot of the contention deputy channel is divided into 56 sub-slots. However, the number of sub-slots may vary without limited to the embodiments.

Also, the sub-slot 0 may be reserved as a clearing slot for the priority terminals. The terminal having priority may select one sub-slot from the sub-slot 1 up to the sub-slot N. The terminals having no priority may perform contention of selecting one sub-slot from the sub-slot 1 up to the last 55. Here, for example, N may range 2 to 53.

In the above-described environment, the terminal having the priority has only the higher contention win probability than the terminal having no priority, and does not always win the terminal having no priority.

Figure 8:
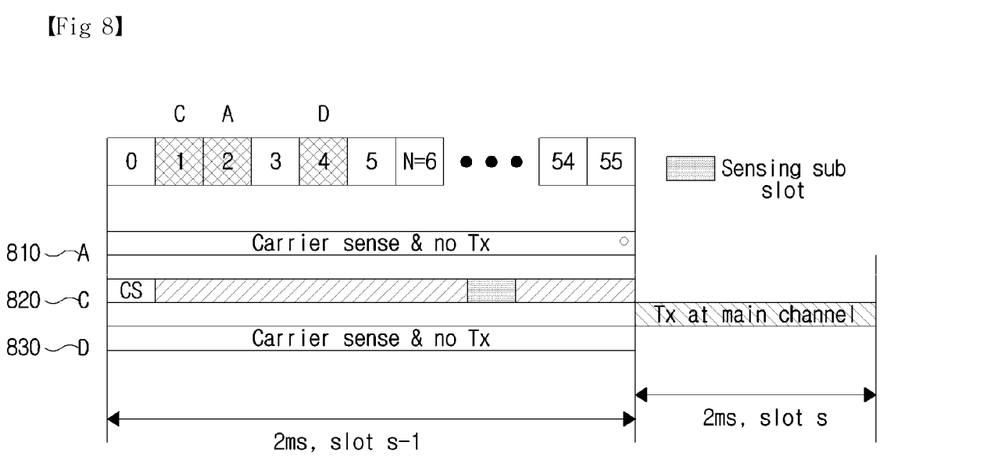
FIG. 8 is an exemplary view illustrating third proposed priority setting.

More specifically, referring to FIG. 8, a terminal A 810 and a terminal D 830 may have the priority, and a terminal C 820 may not have the priority. Here, N is 6, and the terminal A 810 and the terminal D 830 may select the sub-slots 2 and 4, respectively. However, for example, when the terminal C 820 having no priority select the sub-slot 1, the terminal C 820 may win the contention regardless of the priority. The terminal C 820 that has won the CSMA/CA contention first may perform the CDAD contention second.

For example, such priority setting may be performed on all slots of the channel, or on some slots.

Last, in SOTDMA, a clearing method for ACK transmission that occurs specially in allocating a slot will be described.

As described above, the sub-slot 0 may be mostly reserved as the clearing sub-slot for the already allocated slot. Here, additionally, the sub-slot 1 may be reserved as the clearing sub-slot for an ACK signal in response to an allocation request. After the terminal A win the contention, the terminal A may transmit a slot allocation signal to the slot s to request allocation to the terminal B. Thus, the terminal B is required to obtain a right to use by priority when the slot is not being used by another terminal. Thus, when the sub-slot 1 is reserved as the clearing sub-slot for the ACK signal in response to the allocation request, frequent collision in allocating resources may be prevented. After performing clearing at the sub-slot 1, as described above, the terminal B selects the first sub-slot and performs contention in the CSMA/CA scheme, and then selects the second sub-slot and performs contention in the CDAD scheme.

Figure 9:
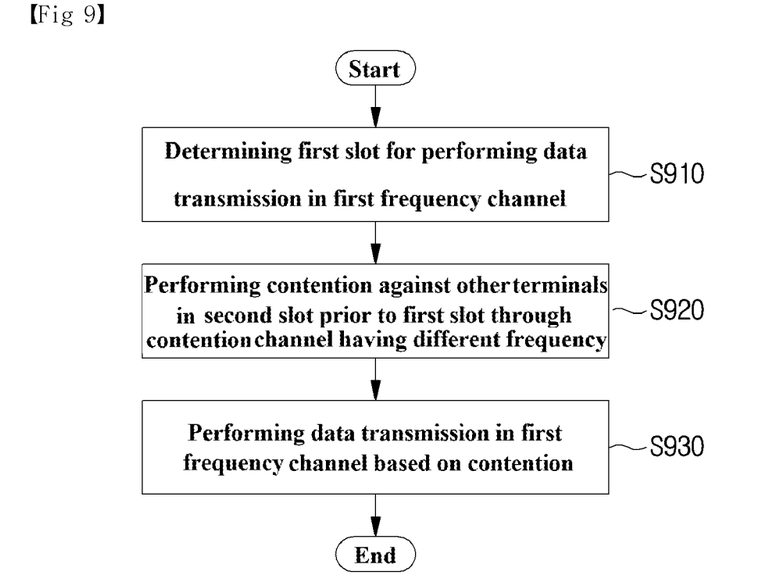
FIG. 9 is a flowchart illustrating a method of avoiding collision according to the present invention.

FIG. 9 is a view illustrating a method of avoiding collision according to the present invention.

Referring to FIG. 9, a terminal may determine a first slot for performing data transmission in a first frequency channel at step S910. Also, the terminal may perform contention against other terminals in a second slot prior to a first slot through a contention channel having a different frequency at step S920. Here, as described in FIGS. 1 to 8, the first slot may be a slot for transmitting data by the terminal. Also, the second slot may be a slot immediately before the first slot. Also, as another example, the second slot may be a slot positioned before the first slot, even if is not immediately before the first slot. That is, the second slot may be a slot which is set to perform contention before the first slot where data transmission is performed, and it is not limited to the embodiment.

Next, the terminal may perform data transmission in the first frequency channel based on contention at step S930. Here, as described in FIGS. 1 to 8, the terminal may perform contention in a second frequency channel. That is, the terminal may perform contention in the second slot by using the second frequency channel. Here, the first frequency channel may be a main channel for performing data transmission, and the second frequency channel may be the contention deputy channel as described above. Here, for example, the second frequency channel may be a channel narrower than the first frequency channel. Also, the first frequency channel and the second frequency channel may be adjacent to each other or spaced apart from each other, and are not limited to the embodiment.

Also, the second slot may include multiple sub-slots. Here, the terminal may select the first sub-slot from the sub-slots. That is, the terminal may select a particular sub-slot from the sub-slots. The terminal may perform carrier sensing from the starting sub-slot until the first sub-slot in the second slot is reached. Here, when the terminal may not detect a signal until the first sub-slot is reached, the terminal may transmit a contention tone signal starting from the first sub-slot up to the last sub-slot in the second slot. Also, data transmission may be performed in the first slot through the first frequency channel. That is, when there is no other signal until the first sub-slot is reached, the terminal occupies the sub-slots with the contention tone signal, and performs data transmission in the first slot which is a subsequent slot.

Also, when the terminal senses a contention tone signal of another terminal while performing carrier sensing, the terminal may drop data transmission. That is, when the sub-slots are occupied on the basis of another contention tone signal, the terminal may not perform data transmission in the first slot which is a subsequent slot.

Also, as another example, the terminal may select a second sub-slot from a sub-slot subsequent to the first sub-slot up to the last sub-slot within the second slot. Here, when multiple terminals select the first sub-slot, the multiple terminals may transmit the contention tone signals starting from the first sub-slot. The terminal may further perform signal sensing in the second sub-slot. As described above, when thousands or tens of thousands of terminals are present, collision avoidance may not be effectively performed on the basis of the limited number of sub-slots. Thus, for the terminals that have selected the same sub-slot, signal sensing may be performed one more in the subsequent sub-slot. Here, when the terminal senses the contention tone signal in the second sub-slot, the terminal may stop transmitting of the contention tone signal starting from the second sub-slot and may drop data transmission. In contrast, when the terminal does not sense the contention tone signal in the second sub-slot, data transmission may be performed in the first slot through the first frequency channel. That is, as described above, a terminal having a second sub-slot with the highest number being sensed may win the contention, and thus data transmission may be performed in the first slot which is the subsequent slot.

Figure 10:
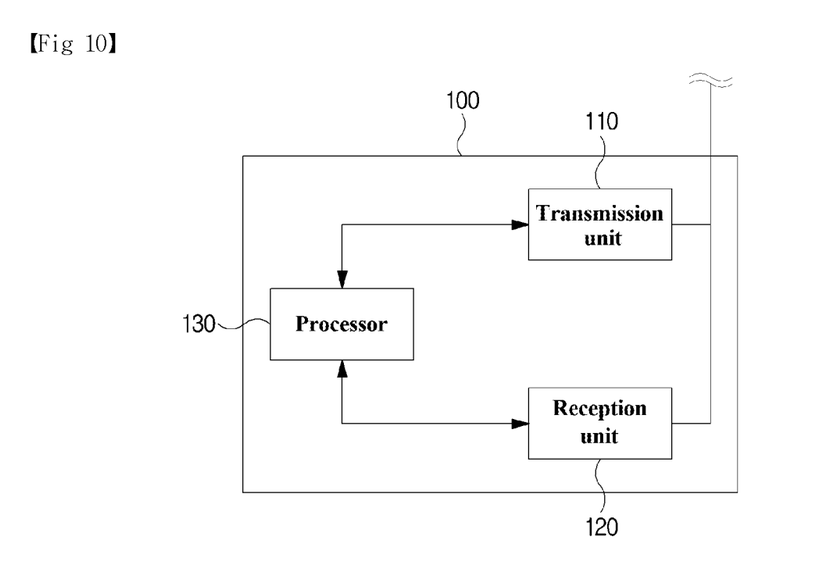
FIG. 10 is a view illustrating a device according to the present invention.

FIG. 10 is a block diagram illustrating a terminal device.

A terminal device 100 may include: a transmission unit 110 transmitting a wireless signal; a reception unit 120 receiving a wireless signal; and a processor 130 controlling the transmission unit 110 and the reception unit 120. Here, the terminal 100 may perform communication with an external device through the transmission unit 110 and the reception unit 120. Here, the external device may be another terminal device, a base station, or other devices capable of performing communication, without being limited to the embodiment.

Here, as described above, selecting, by the terminal, the slot and executing operation may be performed based on the processor 130. Also, it is possible to further include other configurations, and is not limited to the above configuration. That is, the above configuration may be the minimum configuration for implementing the present invention, and additional configurations may be included.

Also, the terminal device in the present invention is a mobile terminal, and is not limited to a smart phone. For example, the terminal device may be one of a drone, a vehicle, an IoT device, and other devices. For example, based on the present invention, collision avoidance between drones may be performed. Also, for example, based on the present invention, collision avoidance between vehicles on the basis of inter-vehicle communication may be performed. Also, for example, collision avoidance between multiple devices, such as home appliances may be performed, and is not limited to the embodiment.

That is, when collision avoidance is required, the present invention may apply to a device capable of performing communication.

The embodiments of the present invention may be realized various means. For example, the embodiment of the present invention may be realized by hardware, firmware, software, or a combination thereof.

The detailed description of the exemplary embodiments of the present invention has been given to enable those skilled in the art to realize and implement the present invention. Although the present invention has been described with reference to the exemplary embodiments, those skilled in the art will appreciate that various modifications and variations can be made in the present invention without departing from the spirit or scope of the invention described in the appended claims. Accordingly, the invention should not be limited to the embodiments described herein, but should be accorded the broadest scope consistent with the principles and novel features disclosed herein. Although the exemplary embodiments of the present invention have been illustrated and described above, the present invention is not limited to the aforesaid particular embodiments, and can be variously modified by those skilled in the art without departing the gist of the present invention defined in the claims. The modifications should not be understood individually from the technical idea or perspective of the present invention.

In addition, the present invention describes both a device invention and a method invention, and descriptions of both inventions may be complementarily applied as needed.

Also, the exemplary embodiments of the present invention have been particularly described. It will be understood by one of ordinary skill in the art that various changes in form and details may be made therein without departing from the spirit and scope of the invention as defined by the following claims. Thus, the exemplary to embodiments should be considered in a descriptive sense only and not for purposes of limitation. Therefore, the scope of the invention is defined not by the detailed description of the invention but by the following claims, and all differences within the scope will be construed as being included in the exemplary embodiments.

INDUSTRIAL APPLICABILITY

The present invention may apply to other systems that may operate identically without being limited to a distributed system.

The invention claimed is:

1. A method of avoiding collision by a terminal in a wireless communication system, the method comprising:
   determining a first slot for performing data transmission in a first frequency channel;
   performing contention in a second slot prior to the first slot against other terminals; and
   performing the data transmission in the first frequency channel based on the contention,
   wherein the contention performed in the second slot is performed through a second frequency channel,
   wherein the second slot includes multiple sub-slots,
   wherein the terminal selects a first sub-slot from the multiple sub-slots and performs carrier sensing from a starting sub-slot until the first sub-slot in the second slot is reached, and
   wherein when the terminal does not detect a contention signal until the first sub-slot is reached, the terminal selects a second sub-slot from among a sub-slot subsequent to the first sub-slot up to a last sub-slot in the second slot, transmits the contention signal starting from the first sub-slot until the second sub-slot is reached, and performs the carrier sensing in the second sub-slot.

2. The method of claim 1, wherein when the terminal detects the contention signal until the first sub-slot is reached, the terminal drops the data transmission.

3. The method of claim 1, wherein when the terminal determines that another contention signal is present through the carrier sensing performed in the second sub-slot, the terminal drops transmitting of the contention signal starting from the second sub-slot, and drops the data transmission in the first slot.

4. The method of claim 1, wherein when the terminal determines that there is not another contention signal through the carrier sensing performed in the second sub-slot, the terminal transmits the contention signal starting from a sub-slot subsequent to the second sub-slot up to the last sub-slot, and performs the data transmission in the first slot through the first frequency channel.

5. The method of claim 1, wherein the first frequency channel is a main frequency channel, and
   the second frequency channel is a contention deputy channel.

6. The method of claim 1, wherein the wireless communication system is a synchronous wireless communication system.

7. The method of claim 1, wherein a contention signal of the second frequency channel is a tone signal.

8. A method of avoiding collision by a terminal in a wireless communication system, the method comprising:
   determining a first slot for performing data transmission in a first frequency channel;
   performing contention in a second slot prior to the first slot against other terminals; and
   performing the data transmission in the first frequency channel based on the contention,
   wherein the contention performed in the second slot is performed through a second frequency channel, and
   wherein the second slot includes multiple sub-slots,
   a starting sub-slot of the multiple sub-slots is designated as a slot clearing sub-slot for a terminal that has used the first slot in a previous frame, and
   the terminal that has used the first slot in the previous frame transmits a contention signal in the slot clearing sub-slot.

9. The method of claim 8, wherein a terminal having no priority performs carrier sensing in the slot clearing sub-slot,
   when the contention signal is detected through the carrier sensing, the data transmission in the first slot is dropped, and
   when the contention signal is not detected through the carrier sensing, a first sub-slot is selected from sub-slots consisting of a sub-slot subsequent to the starting sub-slot up to a last sub-slot, and the carrier sensing is further performed starting from the sub-slot subsequent to the starting sub-slot until the first sub-slot in the second slot is reached.

10. The method of claim 1, wherein
    an arbitrary one slot of the multiple sub-slots is designated as a priority sub-slot for a terminal having priority,
    the terminal having priority performs carrier sensing until the priority sub-slot is reached,
    when a contention signal is not detected through the carrier sensing, the contention signal is transmitted in the priority sub-slot, and
    a first sub-slot is selected from sub-slots consisting of a sub-slot subsequent to the priority sub-slot up to a last sub-slot, and the carrier sensing is further performed starting from the sub-slot subsequent to the priority sub-slot until the first sub-slot in the second slot is reached.

11. The method of claim 10, wherein a terminal having no priority performs the carrier sensing until the priority sub-slot is reached,
    when the contention signal is detected through the carrier sensing, the data transmission in the first slot is dropped, and
    when the contention signal is not detected through the carrier sensing, the first sub-slot is selected from the sub-slots consisting of the sub-slot subsequent to the priority sub-slot up to the last sub-slot, and the carrier sensing is further performed starting from the sub-slot subsequent to the priority sub-slot until the first sub-slot in the second slot is reached.

12. The method of claim 1, wherein
arbitrary continuous several slots of the multiple sub-slots are designated as a priority sub-slot group for a terminal having priority,
the terminal having priority performs carrier sensing until the priority sub-slot group is reached,
when a contention signal is not detected through the carrier sensing, a first sub-slot is selected from the priority sub-slot group, and
the carrier sensing is further performed starting from a start of the priority sub-slot group until the first sub-slot is reached.

13. The method of claim 12, wherein a terminal having no priority performs the carrier sensing until an end of the priority sub-slot group,
when the contention signal is detected through the carrier sensing, the data transmission in the first slot is dropped, and
when the contention signal is not detected through the carrier sensing, the first sub-slot is selected from sub-slots consisting of a sub-slot subsequent to the priority sub-slot group up to a last sub-slot, and the carrier sensing is further performed starting from the sub-slot subsequent to the priority sub-slot group until the first sub-slot in the second slot is reached.

14. The method of claim 12, wherein a terminal having no priority performs the carrier sensing until the priority sub-slot group is reached,
when the contention signal is detected through the carrier sensing, the data transmission in the first slot is dropped,
when the contention signal is not detected through the carrier sensing, the first sub-slot is selected from sub-slots consisting of a starting sub-slot of the priority sub-slot group up to a last sub-slot in the second slot, and
the carrier sensing is further performed starting from the starting sub-slot of the priority sub-slot group until the first sub-slot is reached.

15. The method of claim 1, wherein
a sub-slot subsequent to a starting sub-slot of the multiple sub-slots is designated as an ACK clearing sub-slot for a terminal that has received a slot allocation request,
the terminal that has received the slot allocation request performs carrier sensing until the ACK clearing sub-slot is reached,
when a contention signal is detected through the carrier sensing, the data transmission in the first slot is dropped, and
when the contention signal is not detected through the carrier sensing, the terminal that has received the slot allocation request transmits the contention signal in the ACK clearing sub-slot.

16. The method of claim 15, wherein a terminal that has not received the slot allocation request performs the carrier sensing until the ACK clearing sub-slot is reached,
when the contention signal is detected through the carrier sensing, the data transmission in the first slot is dropped, and
when the contention signal is not detected through the carrier sensing, a first sub-slot is selected from sub-slots consisting of a sub-slot subsequent to the ACK clearing sub-slot up to a last sub-slot, and the carrier sensing is further performed starting from the sub-slot subsequent to the ACK clearing sub-slot until the first sub-slot in the second slot is reached.

17. A terminal for performing collision avoidance in a wireless communication system, the terminal comprising:
a transmission unit transmitting a signal;
a reception unit receiving a signal; and
a processor controlling the transmission unit and the reception unit,
wherein the processor is configured to,
determine a first slot for performing data transmission in a first frequency channel;
perform contention in a second slot prior to the first slot against other terminals; and
perform the data transmission in the first frequency channel based on the contention by using the transmission unit, and
wherein the contention performed in the second slot is performed through a second frequency channel,
wherein the second slot includes multiple sub-slots,
wherein the processor selects a first sub-slot from the multiple sub-slots and performs carrier sensing from a starting sub-slot until the first sub-slot in the second slot is reached, and
wherein when the processor does not detect a contention signal until the first sub-slot is reached, the processor selects a second sub-slot from among a sub-slot subsequent to the first sub-slot up to a last sub-slot in the second slot, transmits the contention signal starting from the first sub-slot until the second sub-slot is reached, and performs the carrier sensing in the second sub-slot.

* * * * *